INVENTORS.
THURMAN O. BRADSHAW
WILLIAM W. ROGERS
BY
ATTORNEY

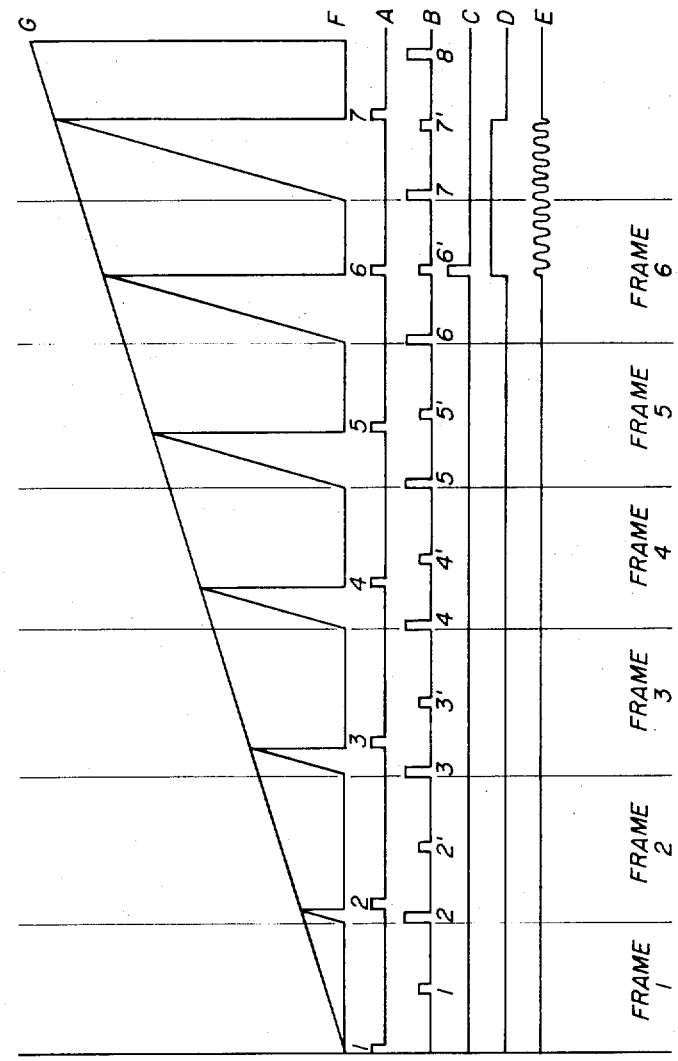

United States Patent Office  3,706,068
Patented Dec. 12, 1972

3,706,068
FISH LOCATOR WITH AUDIO MONITOR
Thurman O. Bradshaw Tulsa, Okla. (129 W. Spruce, Liberal, Kans. 67901), and William W. Rogers, 1317 S. 99th East Ave., Tulsa, Okla. 74128
Filed Jan. 15, 1971, Ser. No. 106,710
Int. Cl. G01s 9/70
U.S. Cl. 340—3 R                                6 Claims

ABSTRACT OF THE DISCLOSURE

A new and improved fish locator with an audio monitor for indicating a change depth at which marine objects are located or moving, including visual means, with audio means to instantly and accurately indicate the change in depth by an audio tone change of all moving marine objects between the fish locator and the lowest depth of the water and by a "beep" indicating the surface of the water and a second beep of lower tone indicating the bottom of the water—the second beep delayed from the surface tone relative to the depth of the water by a time delay.

---

The first locator devices presently on the market operate using the principle of echo ranging and provide visible means of indicating the depth of marine objects. These devices do not provide accurate measurements or adequate audio means for an instant indication of any change in the movement of marine objects between the indicated depth reading on the visual dial of the fish locator.

OBJECTS

The principal object of this invention is to provide apparatus for accurately and instantaneously audio monitoring the depth of bodies of water and the depth of movement of marine objects in water.

Another object of this invention is to provide audible monitoring of changing movement of any marine objects in water with varying audible tones to indicate the depth in the water of the marine objects.

Still another object of this invention is to provide audible means to detect the depth of movement of marine objects at more than one depth instantaneously.

DRAWINGS

FIG. 3 is gradation drawing showing the time sequence pulse relationship between the surface pulse, the echo pulse and the resultant surface tone produced by the audio monitor.

Figure 1:
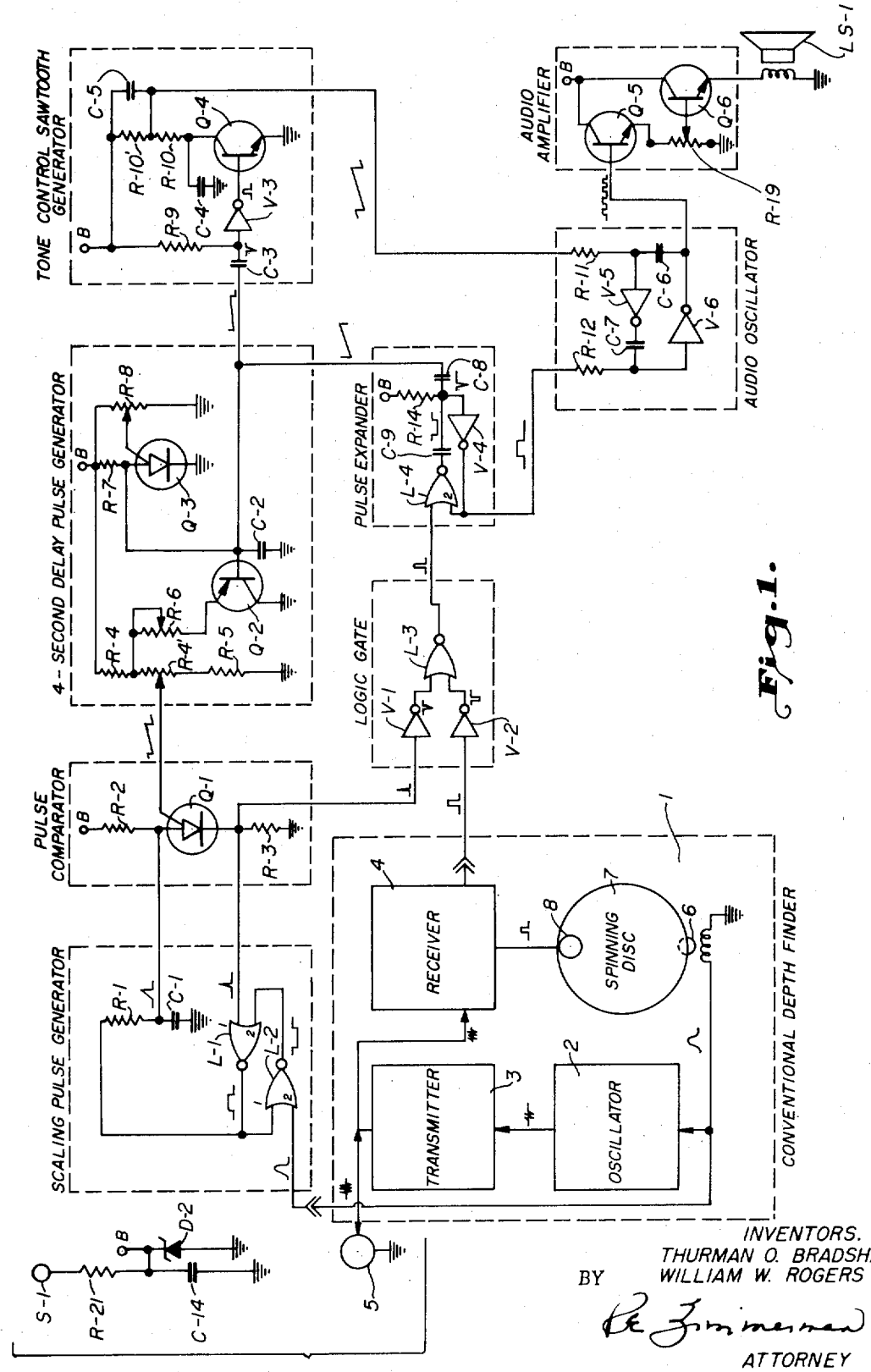
FIG. 1 is a schematic drawing of the electronic circuitry used in the fish locator and the audible depth monitor in combination showing the arrangement and coupling of the electronic components therein.

Reference is made to FIG. 1 which shows the coupling of the individual schematic component circuits. FIG. 1 shows the complete fish locator (depth finder) and audio monitor schematic in combination. The power circuit is shown as S–1 and comprises a resistor R–21, a capacitor C–14 in series to ground, a Zener diode D–2 to ground to reduce the DC power from 12 volts at S–1 to 4.5 volts at position B. Power sources to individual circuits are shown as position B. The depth finder circuit comprises a pick-up coil 1, an oscillator 2, a transmitter 3, a receiver 4 and a spinning disc 7 with a neon light 8. The depth finder circuit will not be described in detail as the component parts are well known in the art. In way of a brief description of the depth finder operation, a pulse is generated in pick-up coil 1 by the magnet 6 on spinning disc 7 passing through the electrical field of the pick-up coil 1. The pulse generated in the pick-up coil 1 keys the oscillator 2 which oscillates at 2000 c.p.s. for the duration of the pulse. The oscillation pulse passes to the transmitter 3 where it is amplified before passing to receiver 4 and transducer 5 at the surface of the water. The oscillation in the receiver 4 is rectified and the output is fed to a neon light 8 in the spinning disc 7, the neon light 8 being located at an O position on the face of spinning disc 7 when indicating a top surface reading. The transducer 5 excited by the amplified pulse from the pick-up coil 1, transmits ultrasonic energy into the surface of the water, the ultrasonic energy travels to the bottom of the body of water and returns to the transducer 5 inducing an electrical pulse of certain magnitude in the transducer 5. The electrical pulse induced in the transducer 5 has a time lapse from the surface pulse equal to the time required for the ultrasonic energy to travel from the transducer 5 to the bottom and return to the transducer 5. A time lapse echo pulse is developed and is passed to receiver 4, then to neon bulb 8 which glows on the spinning disc 7. The reading on the face of the spinning disc 7 indicates the bottom depth of the water or the depth of the marine object in the water between the bottom and surface of the water. The surface pulse and the echo pulse in combination developed in the depth finder create the electronic signals which furnishes intelligence for the audio monitor system. The surface pulse from the pick-up coil 1 is passed directly to the scaling pulse generator circuit. The scaling pulse generator circuit comprises a resistor R–1 and a capacitor C–1 in series attached to ground and two NOR gates L–1 and L–2 which form a latch. In operation a NOR gate fed with all low pulses will invert to discharge a high pulse. A NOR gate fed with one or more high pulses will invert to discharge a low pulse. It should be noted in the following paragraphs, a reference to a high pulse is positive voltage; to a low pulse is zero voltage. The positive pulse which enters from pick-up coil 1 to the scaling pulse circuit enters at a latch consisting of NOR gate L–2 and gate L–1; the pulse entering at position 2, gate L–2. To provide for clarity for discussion, the output of gate L–2 and the input of gate L–1 at position 2 shall be called Loop 1, further the output of gate L–1 and the input of gate L–2 at position 1 shall be called Loop 2. The positive pulse from the pick-up coil 1 entering NOR gate L–2 position 2 turns on the NOR gate L–2; the pulse is inverted, the output of gate L–2 goes low, position 2, gate L–1 is low. The output of gate L–1 is inverted and discharges a high pulse to position 1, gate L–2. For the duration of the surface pulse, inputs positions 1 and 2 gate L–2 are high. The positive pulse is also applied to the RC network, resistor R–1 and capacitor C–1 in the scaling pulse generator. After the surface pulse passes, gate L–2 is low at position 2 but gate L–2 remains high at position 1, therefore at this instance Loop 1 is low and Loop 2 is high. This condition remains until a high is applied to position 1, gate L–1. RC network, resistor R–1 and capacitor C–1 provides sharp sawtooth voltage to the anode of programable unijunction transistor Q–1 (abbreviated throughout this disclosure as PUT Q–1). When the voltage on the anode of the PUT, Q–1 rises to a point equal to the voltage in gate lead of PUT, Q–1 coming from the four second delay pulse generator, PUT, Q–1 conducts and capacitor C–1 discharged through PUT, Q–1 and resistor R–3. This creates a positive pulse on the cathode of PUT, Q–1. This positive pulse is momentarily fed to position 1, gate L–1 and also to inverter L–1 in the logic gate circuit. The positive pulse to position 2, gate L–1 is inverted in gate 2 to low and the output of L–1 goes low and the position 2, L–2 is low. At this instance position 1 and 2, gate L–2 are low, therefore, the pulse passing through is inverted in gate L–2 to high. This high pulse feeds into gate L–1 at position. 2. The high pulse from the cathode of PUT, Q–1 is fed through gate L–1 into gate L–2 at position 1. At this instance Loop 1 is low and Loop 2 is high. The latch, gates L–1 and L–2, remains in this position until a second surface pulse is applied to position 2, L–2 from the pick-up coil 1. The above cycle is repeated again. The combination of the scaling pulse generator and the pulse comparator is to provide a time delayed surface pulse at the cathode of PUT, Q–1, the amount of time delay being determined by the voltage applied at the gate lead of PUT, Q–1.

As was previously stated, the scaling pulse generator develops a scaling pulse repeatedly as the surface pulse is passed from the pick-up coil 1 in the depth finder circuit to the scaling generator circuit. The scaling pulse generator is only functioning during the interval of time which is required to develop a pulse in the scaling pulse generator equal to the amplitude of the pulse from the four second delay pulse generator. When the pulse from the scaling generator and a pulse from the four second delay pulse generator are equal at the anode of the PUT, Q–1, the pulse which passes through to the cathode of PUT, Q–1, is partially passed to the NOR gate L–1, position 1 to reset the scaling pulse generator, the balance is passed to inverter V–1 in the logic gate circuit. In order for the portion of the delayed surface pulse from the cathode of PUT, Q–1 in the pulse comparator circuit to pass through gate L–3, a delayed echo pulse from receiver 4 located in the depth finder circuit must arrive at inverter V–2 simultaneously with the surface pulse arriving at inverter V–1 to trigger the passage of a pulse through gate L–3. The time delay in the delayed echo pulse is defined as the time required for the ultrasonic energy to travel to the bottom of the body of water from transducer 5. The time relationship between the surface and echo delayed pulse will be further explained in the description of FIG. 3. The discharge of the delay surface pulse is controlled by the timing pulse from the four second delay generator fed at the gate of the PUT, Q–1 in the pulse comparator. The time interval of four seconds in the four second delay pulse generator is to form a timing pulse of a four second duration at the gate lead of PUT, Q–1. Reference is made to FIG. 3, Slope G, to show the relating position of the four second delay sawtooth pulse to the delayed surface pulse B, FIG. 3.

Reference is made to the four second delay pulse generator, FIG. 1. In the four second delay pulse generator, FIG. 1, power is fed into the circuit through resistor R–7 to charge capacitor C–2. Resistor R–7 and capacitor C–2 are connected to the anode of PUT, Q–3, the cathode of PUT, Q–3 being connected to ground. Resistors R–4 and R–4' set the holding voltage on gate lead of PUT, Q–1 in the pulse comparator circuit. Resistor R–6 forms the shape, and resistor R–4 phases the pulse manually set by potentiometer R–8. Resistor R–5 sets the positioning voltage developed by resistor R–4. Transistor Q–2 is used to isolate the four second delay pulse generator circuit, the output of the four second delay pulse generator in the form of a sawtooth pulse is fed into the gate lead of transistor of PUT, Q–1.

When both the delayed pulse from the scaling pulse generator and the delayed echo pulse from the depth finder circuit arrive at the same time, the pulse formed passes from the NOR gate L–3 in the logic gate circuit to NOR gate L–4 position 1, located in the pulse expander circuit. Here the pulse is expanded for a length of time determined by capacitor C–9 and resistor R–14. The four second delay pulse generator passes a negative pulse to capacitor C–8 in the pulse expander whenever the four second delay pulse generator recycles. In the operation of the pulse expander, when a high pulse is applied to gate L–4 position 1, the output of L–4 to capacitor C–9 is low, at this instance the input to inverter V–4 from capacitor C–9 is low. As the capacitor C–9 charges through resistor R–14 powered from source B, the voltage on the input of inverter V–4 increases to a point of conducting, the inverter V–4 conducts the output of V–4 goes low, to gate L–4, position 2, and the output of gate L–4 goes high. The output from inverter V–4 is high at the beginning of the high pulse audio keying. The low pulse from the four second delay pulse generator circuit is applied to the input of inverter V–4 through capacitor C–8 in the pulse expander. This low pulse triggers the pulse expander. This pulse completes the same cycle through the pulse expander circuit as the high pulse coming from the logic gate circuit entering gate L–4 at position 1. The expanded pulse turns on the oscillator for the duration of the expanded high pulse. The low pulse from the four second delay pulse generator also passes to the tone control sawtooth generator passing through capacitor C–3 to the base of transistor Q–4 to trigger transistor Q–4 through inverter V–3. Capacitor C–4 is discharged. Capacitor C–4 which is connected to ground charges through resistors R–10 and R–10' creating a sawtooth voltage which is passed to the audio oscillator circuit whenever the four second sawtooth pulse generator recycles. Resistor R–9 in the tone control sawtooth generator hold input to inverter V–3 high so that the output to the base of transistor Q–4 will be low except during the interval of the input of negative pulse to inverter V–3. Capacitor C–5 in the tone control sawtooth generator filters out unwanted signals.

Reference is made to the audio oscillator circuit, FIG. 1, which is coupled to the pulse expander. The oscillator circuit, FIG. 1, only oscillates when a square wave pulse is received by resistor R–12 from the pulse expander circuit. The frequency in the audio oscillator is controlled by the voltage applied between resistor R–10 and R–10' in the tone control sawtooth generator circuit. The specific amount of voltage to resistor R–11 in the oscillator circuit determines the frequency. This is controlled by the charging rate of capacitor C–4 through resistors R–10 and R–10'. The frequency in the audio oscillator at the time it oscillates determines the tone which will be heard from the loud speaker. The selection of the frequency in the oscillator is dependent on the sequence of timing of the operation of the oscillator by the pulse from the pulse expander and the frequency in the oscillating circuit at that time. This regulates the pitch of the tone heard through the loud speaker.

Figure 2:
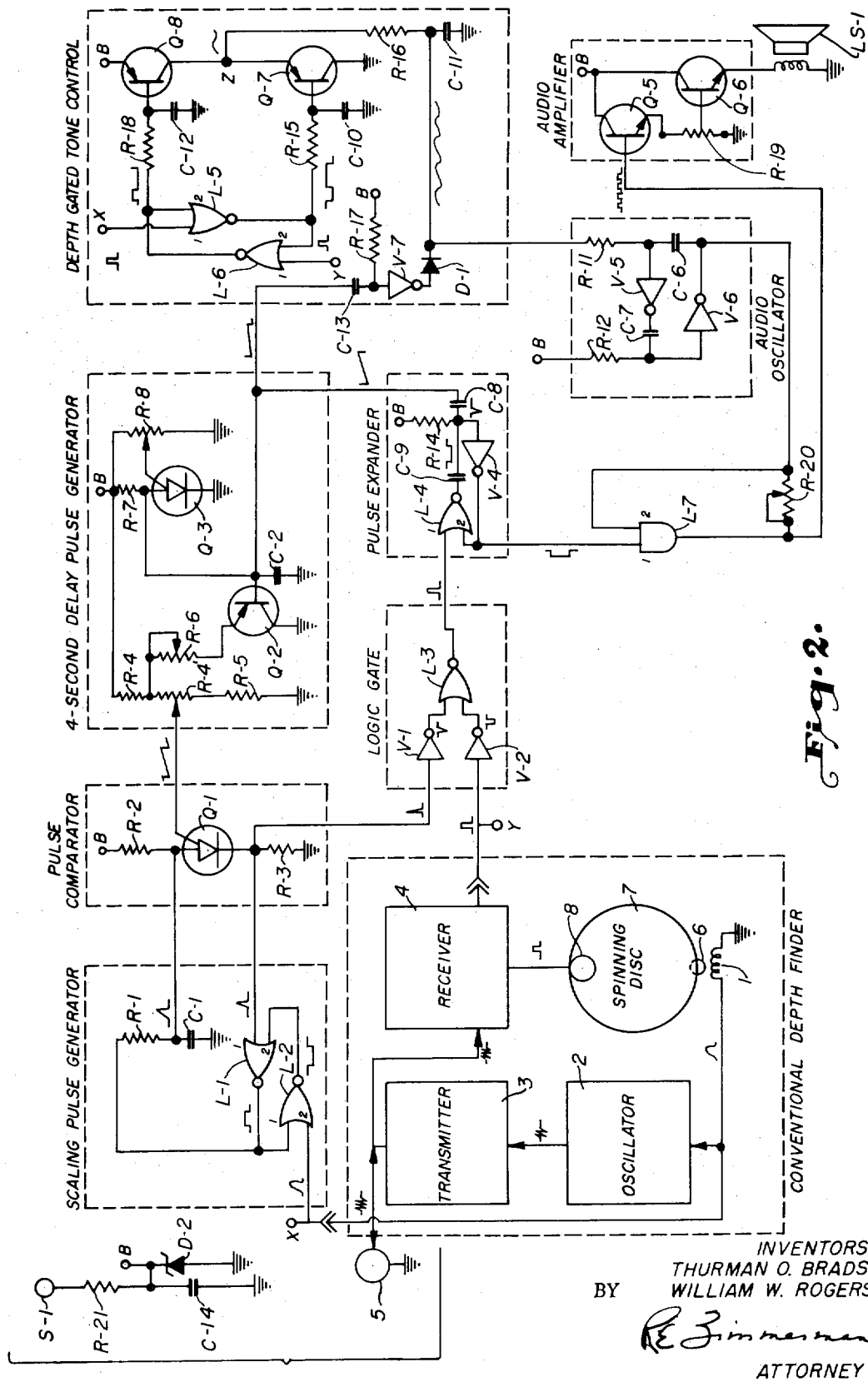
FIG. 2 is a schematic diagram showing an optional depth gated tone control which can be substituted for the tone control sawtooth generator in the electronic circuit shown in FIG. 1.

To provide for an alarm system in the audio monitor system please refer to FIG. 2 which portrays in part the component circuits as previously shown and described with FIG. 1. A depth finder circuit, a scaling pulse generator circuit, a pulse comparator circuit, a second delay pulse generator circuit, a logic gate circuit with a pulse expander circuit and an audio amplifier with a loud speaker. However, in addition to these circuits, FIG. 2 includes a depth gated tone control in place of the tone control sawtooth generator circuit as shown in FIG. 1 and a modified audio oscillator circuit. The depth gated tone control shown in FIG. 2 is substituted for the tone control sawtooth generator shown in FIG. 1 to provide a back ground tone in addition to the tone provided in the basic audio monitor system described in FIG. 1. The background tone is pitched at a lower volume and also provides for an instant change of tone or pitch to indicate any marine objects present in the water between the surface and the bottom of the water or a sudden change in the depth of the water. The change in depth condition reading is indicated by a variation in the pitch or tone. This alarm tone will appear as an amplified side tone during the four second scan provided in the audio monitoring system. The depth gate tone control circuit comprises a source of power B into the circuit, a source of intelligence namely a surface pulse and an echo pulse entering the circuit at X and Y, respectively, two NOR gates L–5 and L–6 forming a latch, a resistor R–18, a capacitor C–12 forming an RC network to control transistor Q–8, and a resistor R–15, a capacitor C–10 forming a second RC network to control transistor Q–7. The above components make up a programable voltage divider network which shall be described in the following paragraph. Capacitor C–13, resistor R–16 and R–17, inverter V–7 and diode D–1 complete the depth gated tone control circuit.

As was previously stated gates L–5 and L–6, a first section comprising, resistor R–18, capacitor C–12, transistor Q–8 and a second section comprising resistor R–15, capacitor C–10 and transistor Q–7 which makes up a programable voltage divider network in the depth gated tone control circuit. Power is applied at point B and enters the voltage divider network from point B through transistor Q–8. Each of these two sections are individually controlled by the operation of transistor Q–7 and Q–8 separately. In the depth gated tone control a high surface pulse enters at point X and is applied to gate L–5, position 1, the output of gate L–5 goes low. This low pulse is applied to the second section creating a low portion in the waveform in the second section. This low portion in the waveform dampened by resistor R–15 and capacitor C–10, triggers transistor Q–7 to discharge any voltage remaining at position Z to ground. This low pulse is also applied to the input of gate L–6, position 2. Positions 1 and 2 being low the output of gate L–6 is high. This creates a high portion of the waveform in the first section of the voltage divider network. The time interval between the flow of the surface pulse and the echo pulse is determined by the time interval for travel of a pulse from the surface to any reflective marine objects or bottom of the water as measured in the depth finder circuit. The echo pulse enters the depth gated control circuit at point Y and is fed into the voltage divider circuit through NOR gate L–6, position 1; the pulse is high so the output of gate L–6 would be low. This low pulse dampened by resistor R–18 and capacitor C–12 triggers Q–8 to allow voltage to flow from position B through transistor Q–8 to position Z. Likewise, the low pulse enters gate L–5 at position 2, the output of gate L–5 at this instance is high. This high pulse dampened by resistor R–15 and capacitor C–10 stops transistor Q–7 from transmitting voltage to ground. The voltage from position B through transistor Q–8 to position Z is filtered by resistor R–16 and capacitor C–11 to be applied to the audio oscillator circuit through resistor R–11 as tone control voltage. The latch comprising gates L–5 and L–6 are sensitive to all surface pulses but only sensitive to the first echo pulse. It is only sensitive to echo pulses that subsequently follow additional surface pulses in the depth gated tone control circuit. In addition another purpose of the first section of the programable voltage divider network is to provide an instant increase in voltage to position Z when the echo pulse indicates a shallow depth. Another purpose of the second section of the programable voltage divider network is to remove voltage at position Z instantly when the echo pulse indicates an increase in depth. This change in the voltage at position Z causes the audio oscillator circuit to generate a higher frequency (higher pitched tone) to indicate shallow marine objects and a lower frequency (lower pitch tone) to indicate when the marine objects are of a deeper measurement.

In the depth gated tone control circuit during the surface pulse it is necessary to have a high frequency pulse. To maintain this high frequency pulse a low voltage is taken from the four second delay pulse generator through capacitor C–13 and through inverter V–7. The inverter V–7 is set with a positive input through resistor R–17. Since the inverter V–7 is set to a positive input, the output will be low, but when the low voltage pulse in this case is applied to the input through capacitor C–13 it overrides the positive input of resistor R–17. The duration of the time that the inverter V–7 conducts depends on the charge of the capacitor C–13. The low input through capacitor C–13 through the inverter V–7 will become a positive output. This positive voltage is then applied through diode D–1 to resistor R–11 in the audio oscillator and sets the audio oscillator to a high frequency during the time of recycle of the four second delayed pulse generator. Diode D–1 is in the depth gated control circuit following inverter V–7 to block any reverse current that might be isolating it from the rest of the circuit until diode D–1 gets the high pulse through inverter V–7 from the delayed pulse generator.

The positive voltage passing out of the depth gated tone control circuit passes to resistor R–16 and capacitor C–11 which acts as a filter network to maintain an even level of DC voltage to resistor R–11 in the audio oscillator circuit. The filter network, resistor R–16 and capacitor C–11 tend to hold the voltage high. However, the appearance of a marine object close to the surface will cause the voltage to cut down instantly. The sudden change in the voltage in the circuit will change the frequency in the audio oscillator and consequently create an instant change in the audible tone from the loud speaker.

As was previously stated the voltage output coming from the depth gated tone control circuit which is the tone control voltage at the audio oscillator is fed into resistor R–11 in the audio oscillator. Constant voltage from point B in the audio oscillator circuit is applied to resistor R–12 because the control voltage from pulse expander is now applied to gate L–7. The audio oscillator is gated in order to produce the background tone along with the amplified tone for the beep. To do this the input from the pulse expander circuit is passed through AND gate L–7 at position 1 and the output of the audio oscillator is also fed into the input of AND gate L–7 at position 2. The output of AND gate L–7 depends on the expander pulse from the pulse expander to turn on the AND gate L–7. The audio oscillator output also passes through a variable potentiometer R–20 which regulates a portion of the audio which is bypassed around L–7 to control the amplitude of the background tone. This amplitude is fed into the base of transistor Q–5 in the audio amplifier circuit. The balance of the output of the audio oscillator passes through AND gate L–7 when the AND gate L–7 is keyed to operate. This output also passes to transistor Q–5 in the audio amplified circuit. This is the tone created by the surface and echo pulse combined coming from the pulse expander circuit. The output of the audio oscillator manifests itself in audible tones through the loud speaker LS–1.

Reference is made to FIG. 3, a diagram which shows the time sequence relationship between the delayed scaling pulse A, FIG. 3, the surface and echo pulse B, FIG. 3 developed in the transducer 5, FIG. 1, the output of the logic gate C, FIG. 3; the output of the pulse expander D, FIG. 3 and the surface tone E, FIG. 3, which is the output of the audio oscillator, FIG. 1 as the surface and echo pulse pass through the audio monitor FIG. 1.

Reference is made to Frame 6, FIG. 3 which shows the output of the pulse comparator, FIG. 1, A, FIG. 3, the surface and echo pulse B, FIG. 3 arriving at the logic gate as shown in FIG. 1 and C, FIG. 3, simultaneously developing an output from the logic gate, FIG. 1 to the pulse expander as shown in FIG. 1 and D, FIG. 3, resulting in the output from the audio oscillator, FIG. 1, E, FIG. 3.

In this operation, the delayed scaling pulse shown in Frame 6 is generated in the spinning disc 1, FIG. 1 and passes to the scaling pulse generator, FIG. 1 to be applied to the anode of the pulse comparator, FIG. 1 in the form of a sawtooth pulse. The scaling pulse recycles whenever the amplitude is equal in magnitude to the four second delay pulse at the anode of the pulse comparator as shown in G, FIG. 3. The delayed scaling pulse 6 is passed from the cathode of PUT, Q–1, FIG. 1 to the logic gate, FIG. 1. The echo pulse from the receiver 4, FIG. 1, for example, Frame 6, FIG. 3, must be at the logic gate simultaneously with the delayed scaling pulse to enter the pulse expander, D, FIG. 3. The expander pulse 6 passes to the audio oscillator, FIG. 1 to operate the audio oscillator which produces a tone through the loud speaker LS–1, FIG. 1.

In the four second sawtooth slope G is shown a continuous linear increase in voltage for four seconds, the base line F representing Zero voltage for each of the applied pulses. Pulses as shown in Frames 1–5 can not pass through the logic gate L–3, FIG. 1 because of the difference in the time delay of the surface pulse and the echo pulse in at logic gate L–3. The surface and echo pulse only pass when scaling pulse 6 in line A and echo pulse 6' in line B arrive simultaneously, a logic pulse as shown in line C develops resulting in an expander pulse, line D and tone line E.

For example, capacitor C–1, FIG. 1 begins its charge at the beginning of the surface pulse. When it reaches voltage as shown on the four second delay sawtooth pulse slope, G the voltage is applied to gate lead of PUT, Q–1, FIG. 1 and drops to zero voltage (base line) F, this procedure is repeated every time the four second delay pulse generates, FIG. 1 recycles.

It will, of course, be understood that various details of construction may be varied through a wide range without departing from the principles of this invention, and it is, therefore, not the purpose to limit the patent granted herein otherwise than necessitated by the disclosure.

We claim:
1. In combination with a depth finder device having means to generate a surface and an echo pulse, an audio monitor system comprising in combination,
   (a) a scaling pulse generator circuit having means for receiving the said generated surface pulse from the said depth finder device,
      (1) the said scaling pulse circuit having means for generating a delayed surface pulse,
      (2) a four second delayed pulse generator circuit having means for generating a first four second delayed pulse,
      (3) the said scaling pulse generator circuit coupled with the four second delayed pulse generator circuit,
      (4) both the said scaling pulse generator circuit and the said four second delayed pulse generator circuit being coupled to a logic gate circuit through,
   (b) a pulse comparator circuit
      (1) the said pulse comparator circuit providing means to sychronize the said delayed surface pulse and the said four second delayed pulse to produce a timed delayed surface pulse for passage to
   (c) the said logic gate circuit,
      (1) the said logic gate circuit having means for receiving simultaneously the said four second timed surface delayed surface pulse from the said pulse comparator and the said echo pulses from the said depth finder device to produce an electrical pulse,
      (2) the said logic gate circuit being coupled to,
   (d) a pulse expander circuit,
      (1) the said pulse expander circuit being coupled with
         (a) the said four second delay pulse generator to receive a second four second delay pulse from the said four second delay pulse generator circuit,
      (2) the said pulse expander circuit having means for expanding the said electrical pulse from the said logic gate and the said second four second delay pulse from the said four second delay pulse generator,
      (3) the said pulse expander circuit also being coupled,
   (e) to an audio oscillator,
      (1) the said electrical pulse from the said pulse expander triggering the said audio oscillator,
      (2) the said audio oscillator, being coupled to a
   (f) tone control sawtooth generator circuit,
      (1) the said tone control sawtooth generator circuit, being coupled to the said four second delay pulse generator circuit,
         (a) the said tone control sawtooth generator circuit producing a pulse,
         (b) the said pulse from the said tone control sawtooth generator circuit producing a
         (c) tone frequency in the said audio oscillator circuit,
   (g) the said oscillator circuit being coupled with an audio amplifying circuit to amplify the said tone frequency produced in the said oscillator circuit
      (1) the said audio amplifying circuit being connected to
   (h) a loud speaker to produce audible tones.

2. The audio monitor system as claimed in claim 1 where the said means in the said scaling pulse generator for scaling the said surface pulse comprises a first gate for receiving the said surface pulse from the said depth finder device, a second gate for directing the said delayed surface pulse through the said pulse comparator to the said logic gate and a RC network for discharging the said delayed pulse to the anode of the transistor in the said pulse comparator.

3. The audio monitor as claimed in claim 2 where the means for sychronizing the said delayed surface pulse from the said scaling pulse generator and the said four second delayed pulse from the four second delay pulse generator in the said pulse comparator comprises a source of current, a resistor between the source of current and the said anode of the said transistor in the pulse comparator circuit for receiving the said surface delayed pulse and the said four second delayed pulse from the said four second delay pulse generator, a second resistor between the cathode of the said first transistor and ground to allow voltage to build up in the cathode of the said transistor.

4. The audio monitor as claimed in claim 3 where the said means to the said logic gate comprises a first inverter for receiving the said surface delayed pulse from the said scaling pulse generator through the said pulse comparator and a said second inverter for receiving the delayed echo pulse from the said depth finder, a first gate in the logic gate circuit for selectively passing the said delayed surface pulse and the said delayed echo pulse to produce an electrical signal to the said pulse expander.

5. The audio monitor as claimed in claim 4 wherein the said means in the pulse expander comprises a first gate in the said pulse expander circuit for receiving an electrical signal from the logic gate, an RC network for charging the inverter, and a capacitor for receiving the said second four second delay pulse from the said four second delay pulse generator.

6. In combination with a depth finder device having means to generate a surface and an echo pulse, an audio monitor system comprising in combination,
   (a) a scaling pulse generator circuit having means for receiving the said generated surface pulse from the said depth finder device,
      (1) the said scaling pulse having means for generating a delayed surface pulse,
      (2) a four second delayed pulse generator circuit having means for generating a first four second delayed pulse,
      (3) the said scaling pulse generator circuit coupled with the four second delay pulse generator circuit,
      (4) both the said scaling pulse generator circuit and the said four second delayed pulse generator circuit being coupled to a logic gate circuit through,
   (b) a pulse comparator circuit
      (1) the said pulse comparator circuit providing means to synchronize the said delayed surface pulse and the said four second delayed pulse to produce a four second time delayed surface pulse for passage to
(c) the said logic gate circuit,
  (1) the said logic gate circuit having means for receiving simultaneously the said four second delayed surface pulse from the said pulse comparator and the said echo pulse from the said depth finder device to produce an electrical pulse,
  (2) the said logic gate circuit being coupled to
(d) a pulse expander circuit
  (1) the said pulse expander circuit being coupled with
    (a) the said four second delay pulse generator to receive a second four second delay pulse from the said four second delay pulse generator
  (2) the said pulse expander circuit having means for expanding the said electrical pulse from the said logic gate and the said second four second delay pulse from the said four second delay pulse generator,
  (3) the said pulse expander circuit being gated through a potentiometer
(e) to an oscillator circuit
  (1) the said oscillator circuit being coupled with
(f) a depth gated tone control circuit
  (1) the said depth gated tone control circuit being coupled to the said four second delay pulse generator circuit,
  (2) the said depth gated tone control circuit having means to produce voltage
    (a) the said voltage producing a tone frequency in the said oscillator circuit
    (b) the said oscillator circuit being gated to
(g) an audio amplifying circuit to amplify the said tone frequency
  (1) the said audio amplifier being connected to
(h) a loudspeaker to produce audible tones.

References Cited
UNITED STATES PATENTS

| | | | |
|---|---|---|---|
| 3,223,965 | 12/1965 | Beebe | 340—3 R |
| 3,588,795 | 6/1971 | Linardos e al. | 340—3 R |

RICHARD A. FARLEY Primary Examiner

U.S. Cl. X.R.

340—3 C